US012090675B2

(12) United States Patent
Ernotte et al.

(10) Patent No.: US 12,090,675 B2
(45) Date of Patent: Sep. 17, 2024

(54) BEARD TRIMMER WITH SUSPENSION SYSTEM FOR THE CUTTING UNIT

(71) Applicant: BABYLISS FACO SRL, Wandre (BE)

(72) Inventors: Aubry Ernotte, Theux (BE); Pierre Julemont, Wandre (BE)

(73) Assignee: BABYLISS FACO SRL, Wandre (BE)

(*) Notice: Subject to any disclaimer, the term of this patent is extended or adjusted under 35 U.S.C. 154(b) by 0 days.

(21) Appl. No.: 18/537,358

(22) Filed: Dec. 12, 2023

(65) Prior Publication Data

US 2024/0109212 A1 Apr. 4, 2024

Related U.S. Application Data

(63) Continuation of application No. PCT/EP2021/085748, filed on Dec. 14, 2021.

(51) Int. Cl.
*B26B 19/38* (2006.01)
*B26B 19/20* (2006.01)

(52) U.S. Cl.
CPC .......... *B26B 19/3846* (2013.01); *B26B 19/20* (2013.01)

(58) Field of Classification Search
None
See application file for complete search history.

(56) References Cited

U.S. PATENT DOCUMENTS

2008/0034591 A1* 2/2008 Fung .................. B26B 19/3866 30/529
2009/0056139 A1* 3/2009 Royle ................. B26B 19/3873 30/526
2014/0259691 A1* 9/2014 Arndt ...................... B26B 19/06 30/277.4
2019/0306259 A1* 10/2019 Burghardt ........... B26B 21/4081
2023/0033691 A1* 2/2023 Knorr ................... B26B 19/388
2024/0109212 A1* 4/2024 Ernotte ................... B26B 19/20

FOREIGN PATENT DOCUMENTS

DE 202009004059 U1 6/2009
WO WO2005122685 A2 12/2005
WO WO2007060590 A2 5/2007

OTHER PUBLICATIONS

International Search Report and Written Opinion of the International Searching Authority from the European Patent Office, in PCT/EP2021/085748 dated Dec. 29, 2022, which is an international application to which this application claims priority.

* cited by examiner

*Primary Examiner* — Hwei-Siu C Payer
(74) *Attorney, Agent, or Firm* — Kolitch Romano Dascenzo Gates LLC

(57) ABSTRACT

The present disclosure relates to a beard trimmer with a handle and a motorized cutting unit having a cutting head and a motor. The motorized cutting unit is attached to a cylindrical movable unit that slides in a complementary cylindrical shape located inside the handle or forming the handle. A resilient means is positioned behind the movable unit. This resilient means is adapted to dampen the pressure of the motorized cutting unit on the skin during use and to create a return force. This return force allows the movable unit to return to its equilibrium position after having released the pressure of the motorized cutting unit on the skin.

9 Claims, 6 Drawing Sheets

BEARD TRIMMER WITH SUSPENSION SYSTEM FOR THE CUTTING UNIT

TECHNICAL FIELD

The present disclosure relates to a beard trimmer, more commonly referred to as a "trimmer," including a suspension mechanism for the cutting unit allowing smoother contact between the trimmer and the skin, so as to provide a better sensation for the user, but also a better cutting result.

BACKGROUND

Beard trimmers comprise a handle as well as a motorized cutting unit. The cutting unit comprises a fixed blade and a movable blade, and can also be provided with a comb so as to adjust the desired cutting length. The user encounters numerous different curves on the face when trimming the beard, in particular at the chin, and the cutting quality largely depends on the usability of the trimmer.

Document WO2005122685 discloses a trimmer with a cutting head and a comb that are arranged on a handle so as to be simultaneously movable relative to the handle, while keeping a constant distance between the cutting unit and the comb so as not to influence the cutting length. Thus, if excessive pressure is applied on the skin, the cutting unit and the comb are withdrawn and the pressure on the skin is reduced. However, because the distance between the comb and the cutting unit is kept constant in movement, the cutting length remains the same. In one particular example of this document, the motor is also movable and set in motion with the cutting unit and the comb. It is located in the handle and is connected to the cutting unit by a "movement converter," allowing the pressure on the cutting unit to be transmitted to the motor, the latter pushing on a spring provided in the handle so as to damp the movements on the skin. This apparatus allows improvement of the cutting sensation and also makes it possible to avoid friction on the skin due to excessive pressure. This device, however, has the drawback of comprising a set of movable parts outside the handle, arranged in a way that makes the trimmer bulky and difficult to use, in particular in tight spaces. Additionally, this trimmer becomes easily dirty and is difficult to clean.

SUMMARY

The present disclosure is aimed at providing a beard trimmer that does not have the drawbacks of the prior art, namely the bulkiness of the device, the difficulties to handle it and the accumulation of dirt. It is in particular aimed at providing a beard trimmer with improved comfort of use due to its usability.

One aim of the disclosure is to provide a trimmer with a suspension system for the cutting unit, allowing better quality cutting owing to the suspension system, which corrects the differences in pressures exerted on the skin, which may lead to differences in lengths. Owing to the practically constant pressure applied on the skin, the cutting is improved. The suspension system also makes it possible to limit the friction of the skin and the unpleasant sensations related to the changes in pressure on the skin.

Another aim is to provide a trimmer with a simplified arrangement of the various elements of the suspension system, in particular relative to the trimmers of the prior art. The aim is to have all the movable elements of the suspension system located inside the handle, avoiding dirt accumulation and making the trimmer easier to clean and to manufacture. In this way, the design of the handle is also simplified and more ergonomic. The cutting unit is as compact as possible, so as to respect the morphological constraints of the face to trim the mustache, for example, and the movements of the cutting head follow the curves of the face without difficulty.

The present disclosure discloses a beard trimmer with a suspended cutting unit, comprising:

- a handle;
- a motorized cutting unit comprising a cutting head and a motor;
- the motorized cutting unit being attached to a cylindrical movable unit that slides in a complementary cylindrical shape located inside the handle or forming the handle and a resilient means being positioned behind the movable unit to damp the pressure of the motorized cutting unit on the skin and to create a return force allowing the movable unit to return to its equilibrium position.

The specific embodiments of the disclosure include at least one or an appropriate combination of the following features:

- the resilient means is a spring or a piston;
- the motorized cutting unit and the resilient means are aligned, the sliding axis of the motorized cutting unit and the movement axis of the resilient means being identical and substantially corresponding to the axis of the part of the handle providing the damping effect;
- the stroke of the resilient means and the distance of movement of the movable unit is between 10 and 30 mm, preferably between 15 and 25 mm and still more preferably equals 20 mm;
- the trimmer comprises a means for adjusting the damping force of the resilient means;
- the damping force of the resilient means may vary between 120 and 500 g;
- the trimmer comprises at least one stop element making it possible to keep said movable unit in the handle when the stroke of the resilient means is maximal;
- the trimmer comprises a mechanism for blocking the cutting unit in one or several fixed positions;
- the movable unit comprises a compression stop coming into contact with the handle when the stroke of the resilient means is minimal;
- the compression stop is a semi-annular surface coinciding with said complementary cylindrical shape located inside the handle or forming the handle;
- the cutting head is removable to allow cleaning.

NUMERICAL REFERENCES OF THE FIGURES

Figure 1:
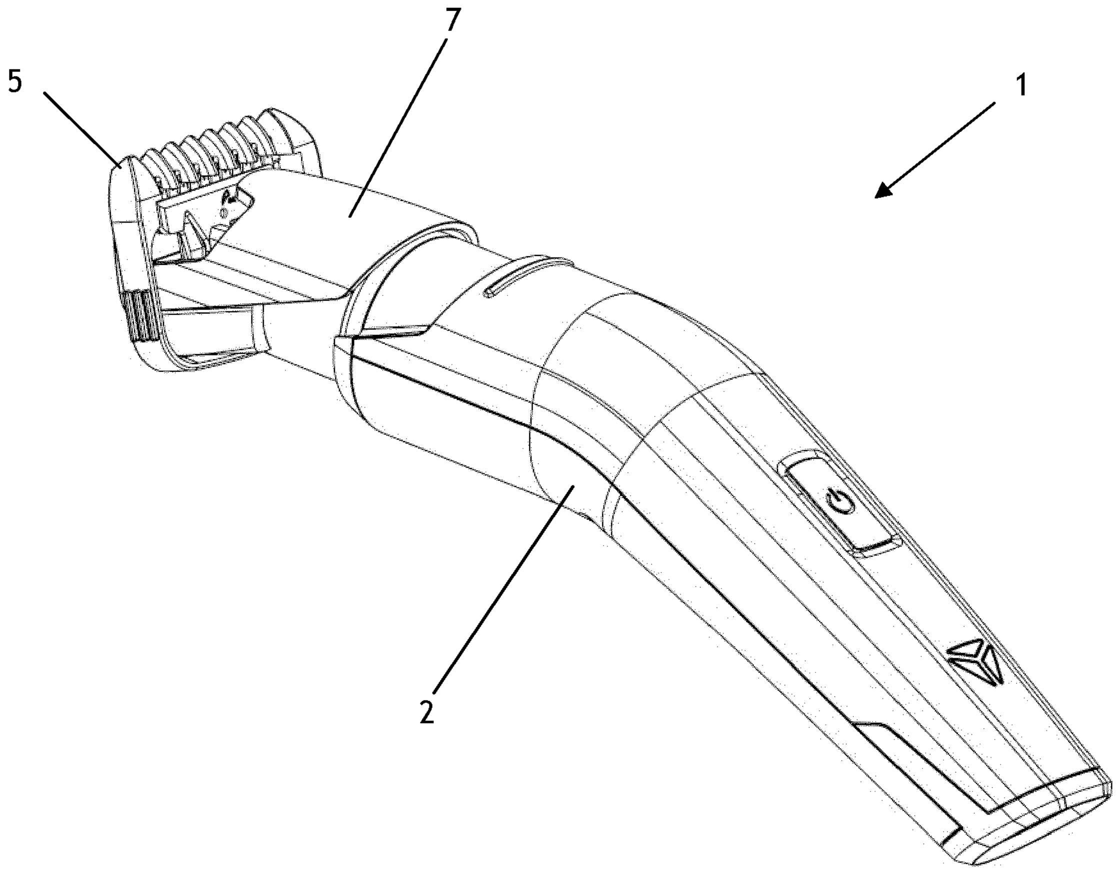
FIG. 1 shows an example of a beard trimmer according to the disclosure in three dimensions and with the cutting unit in the idle position, namely when the stroke of the resilient means is maximal and the movable unit is in a forward position (that is, when it is maximally deployed from the handle). It is the action of the user pressing the trimmer on the skin which exerts pressure on the resilient means and which pushes the movable unit with the motor and the cutting unit toward the inside of the handle. Without pressure, the spring always brings the cutting unit back into its initial idle position.

1. Beard trimmer or "trimmer"
2. Handle
3. Motorized cutting unit
4. Motor
5. Cutting head
6. Movable unit
7. Protective cover
8. Spring (resilient means)
9. Stop element of the motorized cutting unit
10. Electronic system of the trimmer and battery
11. Power cable of the motor, wound inside the spring
12. Alignment axis of the movable unit and the resilient means
14. Compression stop

DETAILED DESCRIPTION

Figure 2:
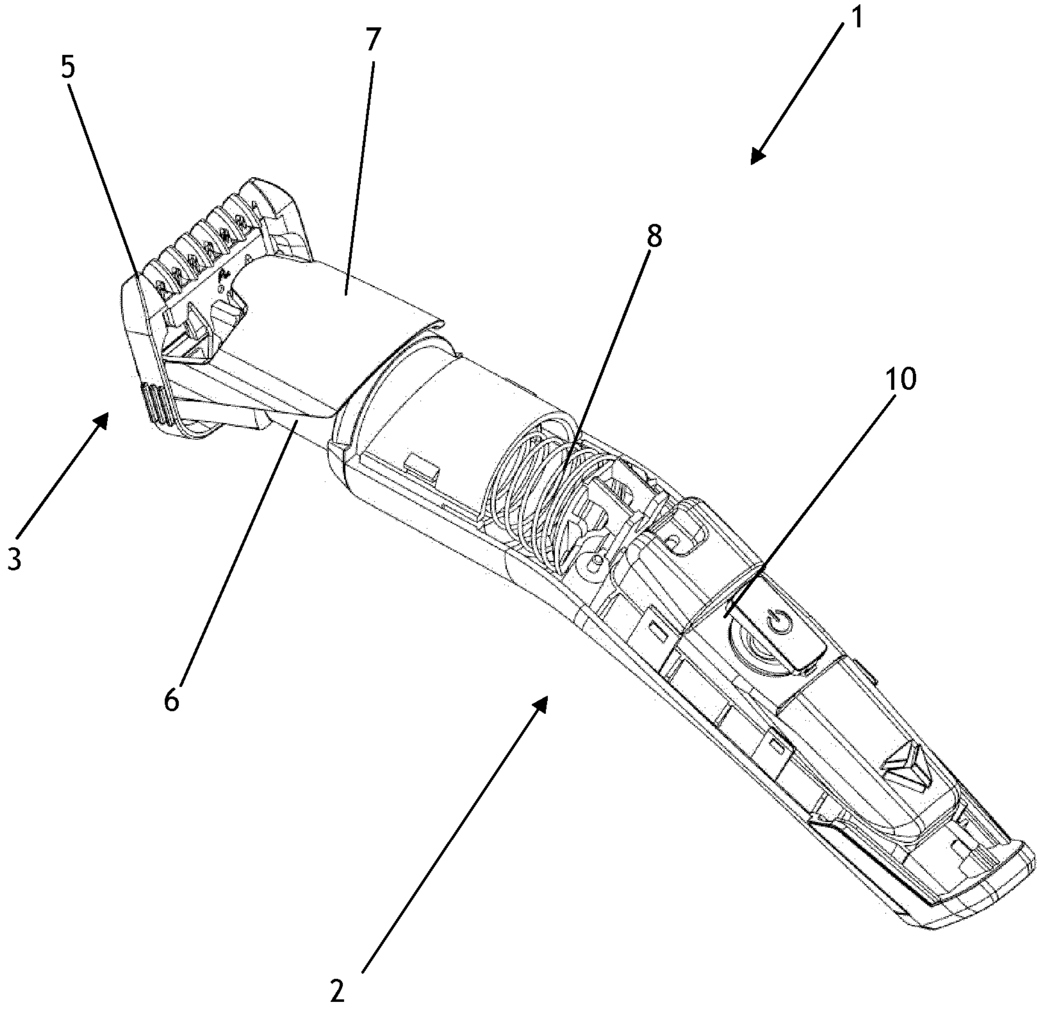
FIG. 2 shows a three-dimensional view of the beard trimmer of FIG. 1, with a part of the handle removed so as to show the elements inside the trimmer. In this case, the stroke of the spring is maximal, and pushes the movable unit partially outside the handle.

The present disclosure discloses a beard trimmer 1 with a handle 2 and a motorized cutting unit 3. The motorized cutting unit, as shown in FIG. 2, comprises a cutting head 5 as well as a motor 4 (see FIG. 4). The cutting unit is attached to a substantially cylindrical movable unit 6, sliding in a complementary, substantially cylindrical shape located inside the handle, thereby allowing the movement of the motorized cutting unit. The movable unit consists of a shell surrounding the motor and part of the cutting unit, the shape of which is complementary to the inner shape of the handle to allow interlocking thereof. Owing to this movable unit, the sliding within the partially hollow handle is done easily, without requiring movable parts outside the handle, which could make the trimmer bulky and cause dirt accumulation, thus rendering cleaning complicated.

In the context of the present disclosure, the trimmer comprises a suspension means for the cutting unit. Indeed, a resilient means 8 is positioned in the handle, behind the movable unit so as to damp the pressure of the motorized cutting unit on the skin. This resilient means is preferably a spring, as shown in the figures, but may also be any other resilient means such as a piston, for example. When the user places the cutting head of the trimmer in contact with the skin, pressure is exerted on the cutting head. This pressure is transmitted to the movable unit, which comprises, as explained previously, the cutting unit and the motor, and which will slide inside the handle while pressing on the resilient means. Depending on the pressure applied by the user on the skin, the movable unit will more or less press on the resilient means, performing to-and-fro movements during trimming of the beard owing to the telescoping interlocking of the movable unit in the handle. This resilient means then allows compensation for the user's movements, which may be too abrupt, jerky or violent. The suspension system therefore makes it possible firstly to soften the user's movements to make the sensation more pleasant, and also to obtain a more uniform cutting length. Indeed, when the user exerts excessive pressure on the skin, the blades of the cutting head are closer to the skin, resulting in a shorter cutting length. It should be noted that a beard trimmer is difficult to handle due to the different angles of the face and that maintaining the same pressure all throughout shaving is not easy for the user.

Figure 6:
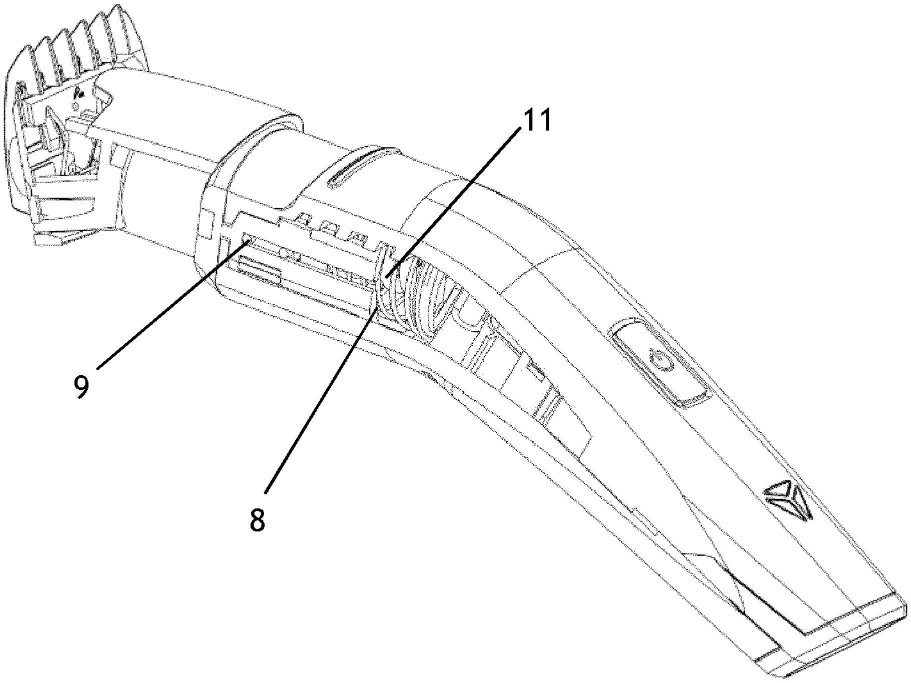
FIG. 6 shows a three-dimensional view of an example beard trimmer according to the disclosure, the cutting unit being in the idle position, with part of the handle removed so as to illustrate the power cable of the motor, wound inside the spring, as well as the stop element of the movable unit.

FIG. 2 illustrates the trimmer with the movable unit in the idle position. In this case, the stroke of the spring is maximal since the cutting head is not experiencing any pressure. The movable unit is in a forward position (that is, it is maximally deployed from the handle). The trimmer comprises at least one stop element 9 to block the movable unit when the stroke of the resilient means is maximal (see FIG. 6). For example, as illustrated in FIG. 6, the latter is in the form of a pin provided on the movable unit and coinciding with a complementary slot provided in the handle. In this way, the movable unit is blocked by the pin located at the bottom of the slot when the stroke of the spring is maximal, thereby preventing the movable unit from completely leaving the handle. This stop element may assume any other form, as long as it makes it possible to retain the movable unit inside the handle when the stroke of the spring is maximal (for example, in the form of an annular or semi-annular stop).

Figure 3:
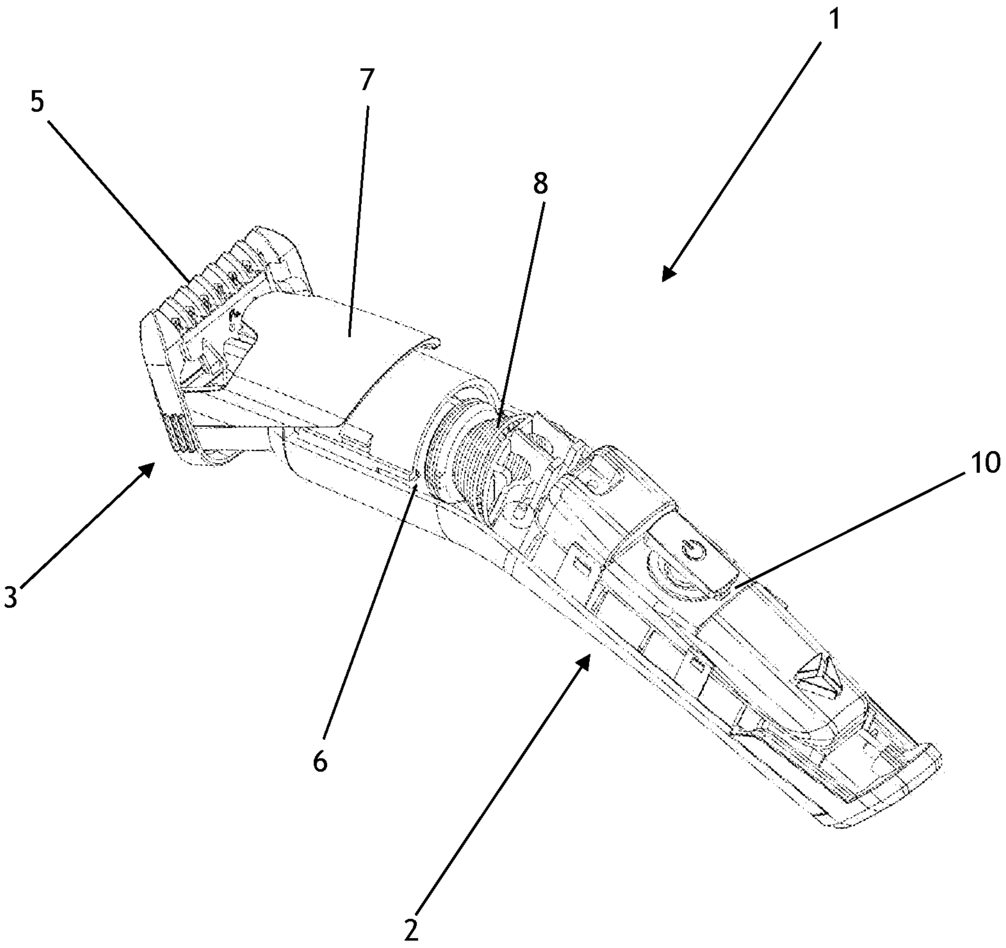
FIG. 3 shows a three-dimensional view of the beard trimmer of FIG. 1, but this time with a minimal stroke of the spring. The latter is squeezed by the movable unit (when the user pushes the cutting unit on the skin).
Figure 7:
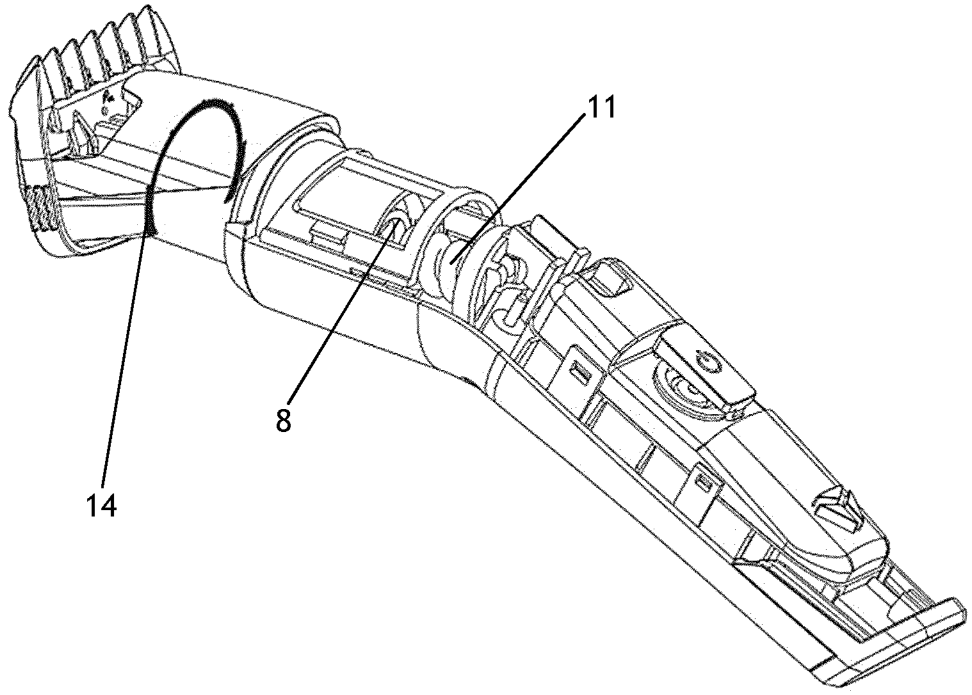
FIG. 7 shows a three-dimensional view of an example beard trimmer according to the disclosure, the cutting unit being in the idle position, with the stop visibly shown even though it is normally only partially visible.

FIG. 3 illustrates the trimmer with the spring shown according to a minimal stroke, the latter being squeezed by the movable unit due to the pressure exerted on the cutting head. FIG. 7 shows an example compression stop 14 located on the movable unit, the latter being visibly shown. In this case the compression stop is a semi-annular surface, located on the perimeter of the movable unit and is in fact only partially visible when the cutting unit is in the idle position. This compression stop may assume any other form. It allows blocking of the handle by compression, when the spring is compressed by the movable unit when pressure is exerted on the cutting head. The handle therefore comes into contact with this compression stop, which, in the case shown, coincides with the cylindrical shape located inside the handle or forming the handle.

The stroke of the resilient means, and therefore the distance of movement of the movable unit toward the inside of the handle, is preferably between 10 and 30 mm, more preferably between 15 and 25 mm, and is still more preferably 20 mm.

Figure 4:
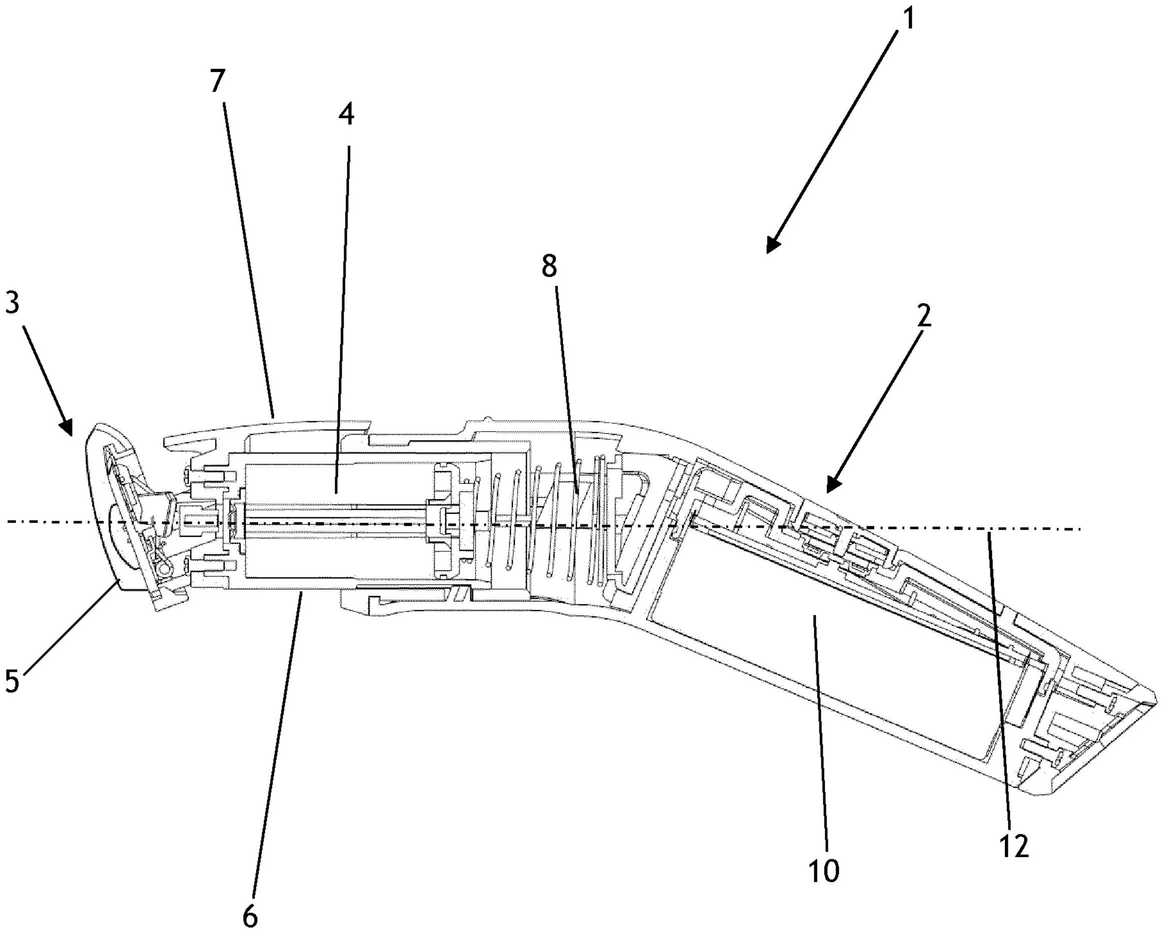
FIG. 4 shows a longitudinal sectional view of a beard trimmer according to the disclosure, the stroke of the spring being maximal because the movable unit is maximally deployed out of the handle.
Figure 5:
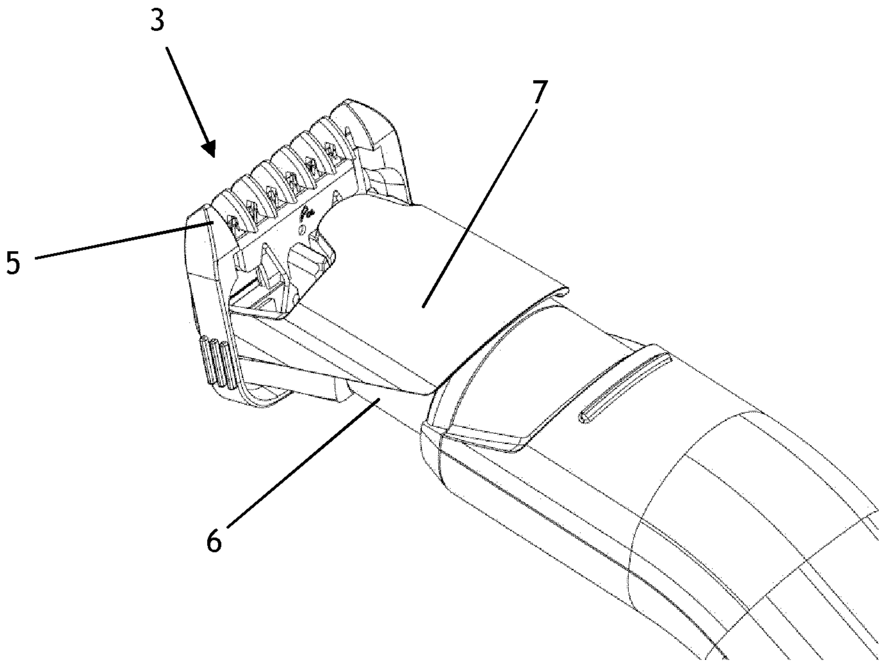
FIG. 5 shows an enlarged view of the cutting head and the movable unit of the trimmer according to the disclosure.

The aim of the beard trimmer according to the disclosure is also to provide the user with a device having a compact and lightweight cutting unit that makes it possible to trim the most difficult-to-access locations of the face and which at the same time allows great freedom of movement. To achieve this aim, the inventor has considerably simplified the suspension system. The motorized cutting unit and the resilient means are aligned, as shown in FIG. 4. The sliding axis of the movable unit and the movement axis of the resilient means are parallel and preferably even identical (axis 12). Simplifying the suspension means of the cutting head makes it possible to limit the bulk around the cutting head and to have an ergonomic handle.

The cutting head is made easier to clean owing to the fact that the cutting unit is located further from the handle when it is idle, since it is pushed by the resilient means. It can therefore be placed under water more easily without getting the rest of the trimmer wet. However, it is preferable for the cutting head to be removable, so as to be detached from the rest of the trimmer to allow more effective cleaning. The trimmer also comprises a protective cover 7 to protect the motor unit and limit the deposit of hairs on the movable unit, and therefore the motor unit.

According to the disclosure, the trimmer may also comprise means for adjusting the damping force of the resilient means 8 (not shown). It may for example be a knob on the handle of the trimmer that can be actuated by the user so as to modify the stroke of the resilient means to modify the damping force. This allows the user to choose the damping force that is best suited for the type of beard trimming being performed. Setting a small damping stroke will increase the force necessary to damp the contact with the skin, and setting a large damping stroke will make the trimmer much more pressure-sensitive.

According to another aspect of the disclosure, the trimmer is equipped with a mechanism for blocking the cutting unit in at least one fixed position. The user can thus block the cutting head at a certain distance from the handle if they temporarily wish to no longer use the suspension function of the trimmer.

The trimmer according to the present disclosure can comprise a rechargeable battery 10, as shown in the figures. The trimmer can be used wirelessly in this way. The trimmer can also be designed to operate only plugged in with a power cable, or can be provided with a combination of both power modes (plugged in or battery-operated). The power supply of the motor is done by an electrical wire 11 connecting it to the electronic system and to the battery 10 of the trimmer. The wire 11 is wound (for example inside the spring 8 as shown in FIGS. 2 and 4), so as to absorb the movements of the movable unit 6.

The invention claimed is:

1. A beard trimmer (1), comprising:

a handle (2); and a motorized cutting unit (3) comprising a cutting head (5) and a motor (4), wherein the motorized cutting unit is configured to apply a pressure on a skin of a user during use;

wherein the motorized cutting unit (3) is attached to a cylindrical movable unit (6) that slides in a complementary cylindrical shape located inside the handle (2) or forming the handle (2); and wherein a resilient means (8) is positioned behind the movable unit (6) and configured to damp the pressure of the motorized cutting unit (3) on the skin during use and to create a return force allowing the movable unit (6) to return to its equilibrium position after having released the pressure of the motorized cutting unit (3) on the skin.

2. The beard trimmer (1) according to claim 1, wherein the resilient means (8) is a spring or a piston.

3. The beard trimmer (1) according to claim 1, wherein the motorized cutting unit comprises a sliding axis (12) and the resilient means (8) comprises a movement axis (12);

wherein the motorized cutting unit (3) and the resilient means (8) are aligned, the sliding axis (12) of the motorized cutting unit (3) and the movement axis (12) of the resilient means (8) being identical.

4. The beard trimmer (1) according to claim 1, wherein the stroke of the resilient means (8) and the distance of movement of the movable unit (6) is between 10 and 30 mm.

5. The beard trimmer (1) according to claim 1, wherein a damping force of the resilient means (8) is configured to vary between 120 and 500 g.

6. The beard trimmer (1) according to claim 1, further comprising at least one stop element (9) configured to keep the movable unit (6) in the handle (2) when the stroke of the resilient means (8) is maximal.

7. The beard trimmer (1) according to claim 1, wherein the movable unit (6) comprises a compression stop (14) configured to come into contact with the handle (2) when the stroke of the resilient means (8) is minimal.

8. The beard trimmer (1) according to claim 7, wherein the compression stop (14) is a semi-annular surface coinciding with the complementary cylindrical shape located inside the handle (2) or forming the handle (2).

9. The beard trimmer (1) according to claim 1, wherein the cutting head (5) is configured to be removable to allow cleaning.

* * * * *